United States Patent [19]

Koishi et al.

[11] Patent Number: 4,985,519

[45] Date of Patent: Jan. 15, 1991

[54] FLUORINE-CONTAINING COPOLYMER USEFUL AS PAINT VEHICLE

[75] Inventors: Toshio Koishi, Sakado; Mikio Ootani, Kawagoe; Seichi Katsuragawa, Tokorozawa; Hideaki Sueta, Saitama, all of Japan

[73] Assignee: Central Glass Company, Limited, Ube, Japan

[21] Appl. No.: 406,093

[22] Filed: Sep. 12, 1989

[30] Foreign Application Priority Data

Sep. 13, 1988 [JP] Japan ................................. 63-229352
Oct. 17, 1988 [JP] Japan ................................. 63-261248

[51] Int. Cl.$^5$ ............................................. C08F 214/18
[52] U.S. Cl. ..................................... 526/249; 526/332; 526/333; 526/250; 526/253; 526/255
[58] Field of Search ............... 526/249, 332, 333, 250, 526/253, 255

[56] References Cited

U.S. PATENT DOCUMENTS 4,631,326 12/1986 Koishi et al. ..................... 526/249
4,640,966 2/1987 Mitani et al. ..................... 526/249

FOREIGN PATENT DOCUMENTS 0276649 4/1988 European Pat. Off. .
2163756 3/1986 United Kingdom ................ 526/249
2189794 11/1987 United Kingdom ................ 526/249

Primary Examiner—Joseph L. Schofer
Assistant Examiner—N. Sarofim
Attorney, Agent, or Firm—Fleit, Jacobson, Cohn, Price, Holman & Stern

[57] ABSTRACT

The invention provides a novel copolymer comprising 25–75 mol % of a fluoroolefin such as CTFE, 10–80 mol % of a combination of a fatty acid vinyl ester having not more than 4 carbon atoms in the acid part and at least one other carboxylic acid vinyl ester which has a larger number of carbon atoms and is selected from aliphatic and aromatic carboxylic acid vinyl esters, 3–40 mol % of a hydroxyl-containing allyl ether such as ethylene glycol monoallyl ether and 0–20 mol % of a carboxyl-containing monomer such as vinylacetic acid. The copolymer has a number average molecular weight of 3000 to 10000. This copolymer possesses favorable properties characteristic of fluororesins, is soluble in organic solvents including aromatic solvents low in polarity, such as xylene, and is curable at relatively low temperatures. A solution of this copolymer is useful as a liquid vehicle of a paint. Optionally, a portion of the vinyl ester component of the copolymer is replaced by an alkyl vinyl ether to enhance pliability of paint films using the copolymer.

13 Claims, No Drawings

FLUORINE-CONTAINING COPOLYMER USEFUL AS PAINT VEHICLE

BACKGROUND OF THE INVENTION

This invention relates to a fluoroolefin base multicomponent copolymer which is soluble in various organic solvents, curable at relatively low temperatures and useful as a paint vehicle.

Fluororesins are generally excellent in weather resistance, heat resistance and chemical resistance. Accordingly paints using a fluororesin as the vehicle have been developed for application to chemical plants, buildings and other constructions, machinery and food containers. Recently much attention has been directed to solvent-thinned paints using a fluororesin which is soluble in organic solvents and curable at normal temperature. Fluororesin paints of this type are comparable to solvent-thinned paints using other conventional resins in the ease of application and provide paint films superior in chemical resistance and weather resistance.

To render a fluororesin soluble in practicable organic solvents, usually it is necessary to reduce crystallinity of the fluroresin by copolymerization to thereby accomplish internal plasticization. Furthermore, there are some other problems to be resolved in using a soluble fluororesin as a paint vehicle. The problems include how to retain a desirable degree of rigidity or shear modulus in the modified fluororesin, how to control the molecular weight of the fluororesin with a view to desirably adjusting the viscosities of paints and how to select and control the kind and amount of functional groups to be introduced into the fluororesin in order to render the resin curable. The cost of production also has to be taken into consideration. It is not easy to reach a balanced solution for all the problems.

U.S. Pat. No. 4,631,326 shows a copolymer of, essentially, chlorotrifluoroethylene, a fatty acid vinyl ester and a hydroxyl-containing allyl ether. This copolymer is soluble in various organic solvents and curable with a polyisocyanate or a melamine resin. The cured copolymer is hardly soluble in organic solvents in which the uncured copolymer is soluble. Therefore, a solution of this copolymer is useful as a liquid vehicle of a paint.

As the vinyl ester in a copolymer of U.S. Pat. No. 4,631,326 it is favorable to use the ester of a fatty acid having not more than 3 carbon atoms in the alkyl group, and in particular either vinyl acetate or vinyl propionate, for physical properties of the copolymer in the form of a coating film and also for the cost of production. However, the copolymer is very low in solubilities in aromatic solvents low in polarity such as toluene and xylene, though the same copolymer exhibits high solubilities in organic polar solvents. It is rather unfavorable to use a polar solvent in a paint, because when the paint is recoated on a paint film or used for repairing a damaged paint film or directly coated on a plastic surface the polarity of the solvent is liable to cause swelling, cracking or clouding or the overlaid paint film or the substrate surface. In the recent automobile industry, for example, it is prevailing to use an aromatic solvent low in polarity represented by xylene as the solvent for paints.

SUMMARY OF THE INVENTION

It is an object of the present invention to provide a fluoroolefin base copolymer which possesses favorable properties of fluororesins such as chemical resistance and weather resistance and is well soluble in organic solvents including aromatic solvents low in polarity and, hence, is practicable as a paint vehicle.

According to the invention there is provided a copolymer comprising 25–75 mol % of a fluoroolefin, 10–70 mol % of a combination of a fatty acid vinyl ester having not more than 4 carbon atoms in the residue of the acid and at least one other carboxylic acid vinyl ester which has a larger number of carbon atoms than said fatty acid vinyl ester and is selected from aliphatic carboxylic acid vinyl esters having at least 4 carbon atoms in the residue of the acid and aromatic carboxylic acid vinyl esters, 3–40 mol % of a hydroxyl-containing allyl ether and 0–20 mol % of a carboxyl-containing monomer, the copolymer having a number average molecular weight in the range from 3000 to 10000.

As will be understood from the above statement, a copolymer according to the invention is a modification of a copolymer according to U.S. Pat. No. 4,631,326.

We have succeeded in greatly increasing the solubilities of the copolymer in organic solvents low in polarity by first reducing the molecular weight of the copolymer. Reducing the molecular weight has the effect of lessening entangling of the copolymer molecules in each other when the copolymer exists in a solvent and hence augmenting affinity of the copolymer molecules with the solvent molecules. Besides, when the copolymer is used as a paint vehicle the lowness of molecular weight makes a contribution to improvement of leveling in forming a paint film so that the paint film has improved appearance particularly in respect of gloss. The lower limit of the molecular weight is set at 3000 in terms of number average molecular weight because further reduction in molecular weight is unfavorable for chemical resistance, weather resistance and other physical properties of the copolymer. When the copolymer has a number average molecular weight higher than 10000 the copolymer may not exhibit high solubilities in organic solvents low in polarity, and solutions of the copolymer become too high in viscosity and hence give paint films inferior in leveling and gloss. The copolymer having an adequately low molecular weight can be prepared by performing radical copolymerization of the monomers in the manner of solution polymerization preferably using an aromatic solvent low in polarity.

However, it is not possible to sufficiently increase the solubilities of a copolymer according to U.S. Pat. No. 4,631,326 in organic solvents low in polarity by merely reducing molecular weight. For example, when a molecular weight reduced copolymer is prepared in xylene the obtained copolymer solution gradually become cloudy or separate into two layers. Another feature of the present invention is increasing an average chain length of the carboxylic acid vinyl ester component of the copolymer by incorporating in the copolymer at least one aliphatic carboxylic acid vinyl ester having a relatively large number of carbon atoms or aromatic carboxylic acid vinyl ester. Increasing the chain length of the carboxylic acid part of the vinyl ester component has the effect of weakening the influence of the carbonyl group as a polar group and thereby facilitating the molecules of a solvent to intrude into the gaps between the copolymer molecules.

Besides, both reducing the molecular weight of the copolymer and increasing the chain length of the carboxylic acid vinyl ester component have the effect of increasing flexibility or pliability of the copolymer in the form of a coating film.

In many cases paint films are desired to have adequate pliability. For example, if a paint film formed on a steel sheet or an elastic substrate lacks pliability, bending of the steel sheet or elastic deformation of the elastic substrate is liable to cause cracking or local peeling of the paint film.

The present invention includes further augmenting pliability of a copolymer according to the invention by using an alkyl vinyl ether as a supplementary comonomer. It is known to afford pliability to a fluororesin by using a curing agent which provides pliable cross-links. However, this method usually results in considerable lowering of tensile strength of the cured fluororesin. Besides, this method is unfavorable for weather resistance and chemical resistance of the fluororesin because the need of using a relatively large amount of the curing agent leads to a decrease in the content of fluorine in the cured resin. As a different measure there is a possibility of using an additive which provides pliability to a fluororesin, but this measure also decreases the content of fluorine in the resin and hence is unfavorable for the weather resistance and chemical resistance of the resin. In the present invention such demerits are obviated by enhancing the pliability of the fluorine-containing copolymer itself. When an alkyl vinyl ether is incorporated in a copolymer according to the invention, a portion of the carboxylic acid vinyl ester component of the copolymer is replaced by the alkyl vinyl ether. That is, the total of the carboxylic acid vinyl esters and the alkyl vinyl ether amounts to 10-70 mol % of the copolymer.

A copolymer according to the invention is excellent in chemical resistance and weather resistance and high in transparency. This copolymer exhibits high solubilities in various organic solvents and is easily curable by an ordinary curing agent such as a polyisocyanate. A solution of this copolymer and a curing agent is useful as a coating liquid composition, and a paint composition is obtained by dispersing a pigment in this solution.

DESCRIPTION OF THE PREFERRED EMBODIMENTS

Good examples of fluoroolefins useful in this invention are trifluoroethylene, chlorotrifluoroethylene, tetrafluoroethylene, hexafluoropropene, vinyl fluoride and vinylidene fluoride. In view of polymerizing reactivities, chlorotrifluoroethylene and tetrafluoroethylene are preferred.

The second component of a copolymer according to the invention is a combination of a fatty acid vinyl ester having not more than 4 carbon atoms in the acid part and at least one other carboxylic acid vinyl ester which is larger in the number of carbon atoms and selected from fatty acid vinyl esters having at least 4 carbon atoms in the acid part and aromatic carboxylic acid vinyl esters. As the first mentioned fatty acid vinyl ester, either vinyl acetate or vinyl propionate is preferred. Good examples of the next mentioned fatty acid vinyl esters are vinyl butyrate, vinyl isobutyrate, vinyl caproate, vinyl isocaproate, vinyl pivalate, vinyl caprylate, vinyl stearate, and VEOVA-9 and VEOVA-10 which are tradenames of Showa-Shell Chem. Co. for vinyl esters of synthetic monocarboxylic acids having 9 and 10 carbon atoms, respectively. Both VEOVA-9 and VEOVA-10 have a branched structure represented by the following formula:

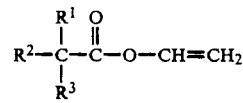

wherein $R^1$, $R^2$ and $R^3$ are alkyl groups at least one of which is methyl group. The total number of carbon atoms in the alkyl groups $R^1$, $R^2$ and $R^3$ is 7 in VEOVA-9 and 8 in VEOVA-10. Preferred examples of aromatic carboxylic acid vinyl esters are vinyl benzoate and vinyl p-t-butylbenzoate.

The ratio of the first mentioned fatty acid vinyl ester to the other carboxylic acid vinyl ester(s) is variable over a very wide range, viz. from 99/1 to 1/99 by mol, though the range of from 95/5 to 5/95 by mol is preferred. When the amount of the vinyl ester(s) relatively large in the number of carbon atoms is too small copolymer is insufficient in solubilities in organic solvents low in polarity. When a very large amount of a fatty acid vinyl ester having more than 4 carbon atoms in the acid part is used the copolymer in the form of a coating film becomes too soft, and when a very large amount of an aromatic carboxylic acid vinyl ester is used the copolymer in the form of a coating film becomes brittle.

The third component, which provides a functional group to the copolymer, is a hydroxyl-containing allyl ether represented by the following general formula.

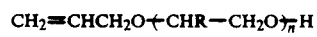

wherein R is H or $CH_3$.

Examples of useful allyl ethers are ethylene glycol monoallyl ether, propylene glycol monoallyl ether, diethylene glycol monoallyl ether, dipropylene glycol monoallyl ether, triethylene glycol monoallyl ether, tripropylene glycol monoallyl ether and hydroxypropylallyl ether. For ease of copolymerization and for enhancement of mechanical strength of the copolymer it is suitable to use an allyl ether for which n in the above formula is 1 or 2. For enhancement of pliability of the copolymer it is suitable to use an allyl ether for which n in the formula is 2 or 4. It is possible to jointly use two kinds of allyl ethers different in the value of n in the formula.

An optional component of the copolymer is a carboxyl-containing monomer, which is preferably selected from acrylic acid, methacrylic acid, vinylacetic acid and allyloxyacetic acid, though it is permissible to use a different monomer such as allylacetic acid or maleic anhydride. This component is used for improving dispersibilities of pigments, in particular organic pigment, in a solution of the copolymer.

As an optional modification, it is possible to replace a portion of the above described carboxylic acid vinyl ester component by an alkylvinyl ether such as, for example, methylvinyl ether, ethylvinyl ether, n-butylvinyl ether, isobutylvinyl ether, 2-ethylhexylvinyl ether and isooctylvinyl ether. When cost and convenience for practial operations are taken into consideration it is preferred to use ethylvinyl ether, n-butylvinyl ether or isobutylvinyl ether. It is possible to replace up to 95 mol % of the vinyl esters by such an alkylvinyl ether. However, when the amount of the alkylvinyl ether is too large the yield of the copolymer lowers. Therefore, it is preferable that the ratio of the total of the carboxylic acid vinyl esters to the alkylvinyl ether falls in the range from 90/10 to 30/70 by mol.

The amounts of the essential and optional components of a copolymer according to the invention are limited within the ranges specified hereinbefore, respectively, in view of the following tendencies.

If the amount of a fluoroolefin is too large the copolymer becomes low in solubilities in organic solvents and, besides, it becomes difficult to prepare the copolymer at good yield. If the amount of the fluoroolefin is too small the copolymer becomes insufficient in chemical resistance and weather resistance. It is preferred that in the copolymer repeating units originating from a fluoroolefin amount to 40–60 mol %. If the total amount of carboxylic acid vinyl esters (or the total amount of carboxylic acid vinyl esters and an optionally incorporated alkylvinyl ether) is too small the copolymer will become too low in molecular weight, and some difficulties will arise in preparing the copolymer. If the total amount of this component is too large the copolymer becomes insufficient in chemical resistance and weather resistance. It is preferred that the repeating units originating from carboxylic acid vinyl esters (and the optional alkylvinyl ether) amount to 20–50 mol %. If the amount of a hydroxyl-containing allyl ether is too small the copolymer becomes weak in susceptibility to curing reaction and, hence, becomes insufficient in chemical resistance and weather resistance, and a coating or painting liquid composition using the copolymer becomes poor in recoatability. If the amount of this component is too large the copolymer will become too low in molecular weight, and some difficulties will arise in preparing the copolymer. It is preferred that the hydroxyl-containing allyl ether component amounts to 5–30 mol %. If the amount of a carboxylic-containing monomer is too large it is difficult to prepare the copolymer at good yield, and the obtained copolymer is relatively low in solubilities in organic solvents and low in moisture resistance. It is preferred that the repeating units originating from a carboxylic-containing monomer amounts to 0–10 mol %.

A copolymer according to the invention is prepared by copolymerizing the indispensable monomers, and the optional monomer(s) if used, in the presence of a radical polymerization initiator. As to the purity of each monomer, gas chromatography purity of 98% or above is sufficient on condition that impurities obstructive to usual radical polymerization reactions are not contained. The manner of the copolymerizing reaction is limited to solution polymerization using an organic solvent with a view to obtain a copolymer relatively low in molecular weight.

Regarding radical polymerization, known methods for obtaining polymers or copolymers relatively low in molecular weight include, besides polymerizing in an organic solvent, using a chain transfer agent, raising the polymerization reaction temperature and increasing the amount of the initiator. However, it is unfavorable to raise the reaction temperature or to increase the amount of the initiator because in either case it becomes difficult to desirably control the temperature of the polymerization reaction. When a chain transfer agent is used, and particularly when it is used in an organic solvent, the polymerization reaction can be carried out under mild conditions, but the use of a chain transfer agent raises problems in other respects. In the case of using a halogen-containing chain transfer agent which is high in the chain transferring effect, the obtained polymer is liable to assume a color. In the case of using a chain transfer agent derived from mercaptan a repulsive odor is emitted. In the case of using a chain transfer agent of a hydrocarbon type problems arise as to its compatibility with the organic solvent, an increase in polarity of the liquid medium by the incorporation of the chain transfer agent and an unfavorable influence of the low boiling point of the chain transfer agent on vapor pressures of the obtained polymer solution. In the present invention it is preferred to carry out the copolymerization reaction in an organic solvent without using any chain transfer agent. We have found that in an organic solvent convenient for practical use such as a lower alkyl substituted benzene represented by xylene, copolymerization of the above described monomers smoothly proceeds and gives a copolymer of a fairly low molecular weight at high yield. The copolymer is obtained as a clear solution in the organic solvent employed as the liquid medium for the reaction, and after simple treatments such as filtration and adjustment of concentration the solution can be used as the basic material of a coating liquid composition or a paint composition.

The copolymerization reaction is carried out at temperatures ranging from −30° C. to 130° C. An optimum temperature for the reaction depends on the kind of the polymerization initiator, but usually it is suitable to carry out the reaction at a temperature in the range from 0° to 100° C. A suitable radical polymerization initiator can be selected from oil-soluble initiators including organic peroxides such as diisopropyl peroxydicarbonate, di-n-propyl peroxydicarbonate, t-butyl peroxypivalate, di-2-ethylhexyl peroxydicarbonate, benzoyl peroxide, lauroyl peroxide, propionyl peroxide, trichloroacetyl peroxide, perfluorobutyryl peroxide and perfluorooctanoyl peroxide, azo compounds such as azobisisobutyronitrile and azobis-2,4-dimethylvaleronitrile and organic boron compounds such as oxytriethylboron and peroxytriethylboron.

Copolymers of the invention are well soluble in aromatic solvents represented by xylene and toluene which are suitable for paint compositions and low in polarity. The copolymers are well soluble also in other various organic solvents including benzene, cyclic ethers such as dioxane and tetrahydrofuran, esters such as ethyl acetate and butyl acetate, ketones such as acetone, methylethyl ketone and cyclohexanone, nitrogen-containing solvents such as dimethylformamide, dimethylacetamide and pyridine and halogen-containing solvents such as 1,1,1-trichloroethane and trichloroethylene. It is free to use a mixture of xylene or toluene with an organic solvent of a different category. In any case a clear and colorless copolymer solution is obtained.

A copolymer of the invention has active hydrogen in the molecular chain and, hence, can be cured by reaction with a compound having a functional group that reacts with active hydrogen. When a coating liquid is prepared by adding a polyisocyanate to a solution of the copolymer in an organic solvent and the solvent is dissipated after applying the coating liquid to a desired surface, curing reaction of the copolymer with the polyisocyanate proceeds at room temperature. When a blocked polyisocyanate is used the curing reaction is accomplished by heat treatment at a temperature above the dissociation temperature of the polyisocyanate. In either case a well cured hard coating film is obtained. The curing agent is not limited to polyisocyanates. It is also possible to use melamine resin, urea resin or a polybasic acid or its anhydride, though heating is needed for accomplishment of curing reaction.

A paint composition is obtained by dispersing a pigment in a solution of a copolymer of the invention and a curing agent in an organic solvent. Either an inorganic pigment or an organic pigment can be used, though in the case of using an organic pigment it is preferable to use a carboxylic-containing monomer in preparing the copolymer. The pigment exhibits good dispersibility in the solution. Besides a pigment, desired additives such as, for example, an ultraviolet absorbing agent and a dispersion stabilizing agent may be added to the solution. Such optional additives too exhibit good dispersibility in the solution.

EXAMPLE 1

A 1.4-liter stainless steel autoclave provided with an electromagnetic stirrer was charged with 154.8 g of vinyl acetate (VAc), 22.8 g of vinyl butyrate (VBu), 79.6 g of ethylene glycol monoallyl ether (EGMAE), 5.2 g of vinylacetic acid (VAA), 6.6 g of a commercial radical polymerization initiator (PERROYL NPP of Nippon Oil & Fats Co., a peroxide), 385.7 g of xylene and 6.6 g of sodium borate. In these materials the molar ratio of VAc to VBu was 90/10. The gas atmosphere in the autoclave was replaced by nitrogen gas, and this operation was repeated twice. After that the nitrogen gas was purged from the autoclave, and 367.7 g of chlorotrifluoroethylene (CTFE) was introduced into the autoclave. Then the temperature in the autoclave was gradually raised up to 40° C., and at this temperature polymerization reaction was carried out for 24 hr. After that unreacted CTFE was discharged from the autoclave, and the reaction liquid was taken out of the autoclave. The reaction liquid was filtered to obtain a colorless and clear solution of a polymer.

The polymer dissolved in the obtained solution was a CTFE/VAc/VBu/EGMAE/VAA copolymer, and the concentration of the copolymer in the solution was 51.3 wt %. This copolymer had a number average molecular weight of 8000 (determined by assuming the copolymer to be polystyrene). The copolymer had an OH value (measured by the acetylation method using acetic anhydride) of 80 (mg KOH/g) and an acid value of 10 (mg KOH/g). The copolymer solution was left standing at room temperature for one month, but no change was observed in the homogeneousness and clearness of the solution.

EXAMPLE 2

The autoclave used in Example 1 was charged with 126.4 g of VAc, 72.0 g of VBu, 61.2 g of EGMAE, 6.4 g of PERROYL NPP, 385.7 g of xylene and 6.4 g of sodium borate. In this case the molar ratio of VAc to VBu was 70/30. The gas atmosphere in the autoclave was replaced by nitrogen gas in the same manner as in Example 1, and then the nitrogen gas was purged from the autoclve. After that 384.4 g of CTFE was introduced into the autoclave, and polymerization reaction was carried out at 40° C. for 24 hr. After discharging unreacted CTFE from the autocalve the reaction liquid was filtered to obtain a colorless and clear solution of a copolymer.

In the obtained solution the concentration of the CTFE/VAc/VBu/EGMAE/VAA copolymer was 53.0 wt %. This copolymer had a number average molecular weight of 8500 and an OH value of 55 (mg KOH/g). The copolymer solution was left standing at room temperature for one month, but no change was observed in the homogeneousness and transparency of the solution.

EXAMPLE 3

A 1-liter autoclave provided with a stirrer was charged with 94.8 g of VAc, 40.8 g of vinyl benzoate (VBe), 54.4 g of EGMAE, 1.8 g of VAA, 8.9 g of PERROYL NPP, 307.7 g of xylene and 4.4 g of sodium borate. The molar ratio of VAc to VBe was 80/20. Then the operations in Example 1 were repeated except that the quantity of CTFE was changed to 252.3 g.

After the copolymerization reaction the reaction liquid was filtered to obtain a colorless and clear solution of a copolymer. In the obtained solution the concentration of the CTFE/VAc/VBe/EGMAE/VAA copolymer was 52.9 wt %. The copolymer had a number average molecular weight of 5300, an OH value of 79 (mg KOH/g) and an acid value of 5 (mg KOH/g). The solution was left standing at room temperature for one month, but no change was observed in the homogeneousness and clearness of the solution.

EXAMPLE 4

The autoclave used in Example 1 was charged with 177.6 g of VBu, 102.9 g of VEOVA-10, 82.0 g of EGMAE, 2.7 g of VAA, 6.6 g of PERROYL NPP, 447 g of xylene and 6.6 g of sodium borate. The molar ratio of VBu to VEOVA-10 (V-10) was 75/25. Then the operations in Example 1 were repeated except that the quantity of CTFE was changed to 380.5 g.

After the copolymerization reaction the reaction liquid was filtered to obtain a colorless and clear solution of a copolymer. In the obtained solution the concentration of the CTFE/VBu/V-10/EGMAE/VAA copolymer was 52.0 wt %. This copolymer had a number average molecular weight of 8000, an OH value of 83 (mg KOH/g) and an acid value of 5 (mg KOH/g).

COMPARATIVE EXAMPLE 1

The process of Example 1 was modified only in that VBu was omitted from the raw materials and that the quantity of VAc was increased by 10%.

As the result a colorless and clear solution of a CTFE/VAc/EGMAE/VAA copolymer was obtained. The concentration of the solution was 51.0 wt %. The copolymer had a number average molecular weight of 8300, an OH value of 78 (mg KOH/g) and an acid value of 9 (mg KOH/g). The solution was left standing at room temperature. In one week the solution separated into two layers.

COMPARATIVE EXAMPLE 2

The process of Example 2 was repeated except that the liquid medium for the polymerization reaction was changed from xylene to butyl acetate.

As the result a colorless and clear solution of a CTFE/VAc/VBu/EGMAE/VAA copolymer was obtained. The concentration of the solution was 55.6 wt %. The copolymer had a number average molecular weight of 17000 and an OH value of 55 (mg KOH/g). The solution was left standing at room temperature. In one week the solution separated into two layers.

EVALUATION TEST 1

Each of the copolymer solutions obtained in Examples 1 to 4 was diluted with xylene to adjust the copolymer concentration to 50 wt %. The copolymer solutions obtained in Comparative Examples 1 and 2 were diluted with butyl acetate to adjust the copolymer concentration to 45 wt % in the solution of Comparative Example 1 and to 50 wt % in the solution of Comparative Example 2.

To test compatibilities (mutual solubilities) of these copolymer solutions with melamine resins, each copolymer solution was mixed alternately with three kinds of melamine resins, viz., a butyrated melamine resin (UVAN 20SE-60 of Mitsui Toatsu Chemicals Co.), a methylated-butyrated melamine resin (NIKALAC MX-40 of Sanwa Chemicals Co.) and a methylated melamine resin (NIKALAC MW-30 of Sanwa Chemicals Co.). In every case 70 parts by weight of a copolymer solution for testing was added to 30 parts by weight of a melamine resin, and the compatibility of the copolymer with the melamine resin was evaluated by visual observation of the mixed liquid and coating films formed by using the mixed liquid. The results are shown in Table 1, wherein "A" means good compatibility and "B" means poor compatibility.

TABLE 1

|  | Melamine Resin | | |
| --- | --- | --- | --- |
|  | UVAN 20SE-60 | NIKALAC MX-40 | NIKALAC MW-30 |
| Example 1 | A | A | A |
| Example 2 | A | A | A |
| Example 3 | A | A | A |
| Example 4 | A | A | A |
| Comp. Ex. 1 | B | A | A |
| Comp. Ex. 2 | B | A | A |

Regarding the reaction of a melamine resin with a polyol the rate of reaction depends on the kind of the functional group at the terminals of the melamine resin. In the case of methylol group the rate of reaction is higher than in the case of amide group, and in the case of an ether group the rate of reaction is lower than in the case of amide group. When a copolymer according to the invention (having hydroxyl group) is to be cured by a melamine resin, it is desirable to choose a melamine resin which retains methylol group beause curing can be accomplished in a short time at a relatively low temperature, and to meet the desire the copolymer needs to be compatible with melamine resins having methylol group. Among the melamine resins used in the above test, both NIKALAC MX-40 and NIKALAC MW-30 are fully etherified melamine resins, and UVAN 20SE-60 is a melamine resin retaining methylol group. In this regard, the test results in Table 1 indicate an important advantage of the present invention.

EVALUATION TEST 2

Using each of the copolymer solutions obtained in Examples 1 to 4, a paint composition was prepared by mixing 100 parts by weight of a white pigment (titanium oxide) and 20 parts by weight of xylene with 100 parts by weight of the copolymer solution, adding 0.1 part by weight of a silica base leveling agent and 20 parts by weight of melamine resin NIKALAC MW-30 to the mixture and making thorough mixing in a ball mill. Each of the copolymer solutions obtained in Comparative Examples 1 and 2 was used to prepare a similar paint composition except that 20 parts by weight of butyl acetate was used in place of xylene.

The paint compositions using the copolymer solutions of Examples 1-4 were each diluted with xylene, and the paint compositions using the copolymer solutions of Comparative Examples 1-2 were each diluted with butyl acetate, to adjust the viscosity to 12 sec (Iwata cup) in every case. Then each paint composition was applied to a chromate treated aluminum plate by spraying, and after drying the paint film was cured by baking at 140° C. for 3 hr. The cured paint film was visually examined and subjected to measurement of gloss, hardness and tightness of adhesion to the aluminum surface. The results are shown in Table 2.

TABLE 2

|  | Ex. 1 | Ex. 2 | Ex. 3 | Ex. 4 | Comp. Ex. 1 | Comp. Ex. 2 |
| --- | --- | --- | --- | --- | --- | --- |
| Gloss (60° specular gloss) | 92 | 90 | 95 | 93 | 90 | 78 |
| Pencil Hardness (max. hardness of pencil failed to give scratch) | H | HB | H | HB | H | H |
| Cross-cut Adhesion Test (no peel areas among 100 areas tested with cellophane tape) | 100/100 | 100/100 | 100/100 | 100/100 | 100/100 | 100/100 |
| Appearance* | A | A | A | A | A | B |

*"A" means good in both smoothness and glossiness; "B" means inferior in smoothness and glossiness.

The following examples relate to copolymers containing an alkyl vinyl ether.

EXAMPLE 5

By the same method as in Example 1, a copolymer was prepared in xylene by using 139.3 g of VAc, 20.5 g of VBu, 40.0 g of n-butylvinyl ether (BVE), 79.6 g of EGMAE, 5.2 g of VAA, 367.7 g of CTFE and 6.6 g of PERROYL NPP. The molar ratio of VAc to VBu was 90/10. The yield of the CTFE/VAc/VBu/BVE/EGMAE/VAA copolymer was 75%.

The obtained copolymer had a number average molecular weight of 7500, an OH value of 83 (mg KOH/g) and an acid value of 12 (mg KOH/g). This copolymer exhibited good compatibility with any of the melamine resins shown in Table 1.

EXAMPLE 6

By the same method as in Example 1, a copolymer was prepared in xylene by using 75.8 g of VAc, 37.4 g of vinyl caprylate (VCy), 19.8 g of ethylvinyl ether (EVE), 54.4 g of EGMAE, 252.3 g of CTFE and 8.9 g of PERROYL NPP. The molar ratio of VAc to VCy was 80/20. The yield of the CTFE/VAc/VCy/EVE/EGMAE copolymer was 77%.

The obtained copolymer had a number average molecular weight of 5000 and an OH value of 80 (mg KOH/g). This copolymer exhibited good compatibility with any of the melamine resins shown in Table 1.

EXAMPLE 7

By the same method as in Example 1, a copolymer was prepared in xylene by using 63.9 g of VAc, 91.9 g of VBu, 29.0 g of EVE, 118.3 g of diethylene glycol monoallyl ether (dEGMAE), 368.2 g of CTFE and 6.8 g of PERROYL NPP. The molar ratio of VAc to VBu was 50/50. The yield of the CTFE/VAc/VBu/EVE/dEGMAE copolymer was 72%.

The obtained copolymer had a number average molecular weight of 8300 and an OH value of 77 (mg KOH/g). This copolymer exhibited good compatibility with any of the melamine resins shown in Table 1.

EXAMPLE 8

By the same method as in Example 1, a copolymer was prepared in xylene by using 69.8 g of VAc, 113.7 g of vinyl caproate (VCo), 40.6 g of BVE, 118.3 g of dEGMAE, 2.5 g of VAA, 368.2 g of CTFE and 14.4 g of PERROYL NPP. The molar ratio of VAc to VCo was 50/50. The yield of the CTFE/VAc/VCo/BVE/-dEGMAE/VAA copolymer was 73%.

The obtained copolymer had a number average molecular weight of 5300, an OH value of 75 (mg KOH/g) and an acid value of 5 (mg KOH/g). This copolymer exhibited good compatibility with any of the melamine resins shown in Table 1.

COMPARATIVE EXAMPLE 3

By the same method as in Comparative Example 2, a copolymer was prepared by using 210.0 g of BVE, 61.2 g of EGMAE, 384.4 g of CTFE and 6.5 g of PERROYL NPP. The yield of the CTFE/BVE/EGMAE copolymer was 49%.

The obtained copolymer had a number average molecular weight of 13700 and an OH value of 57 (mg KOH/mg).

EVALUATION TEST 3

Each of the copolymers of Examples 5–8 and Comparative Example 3 was dissolved in butyl acetate to prepare 50 wt % solution, and a polyisocyanate (CORONATE EH of Nippon Polyurethane Co.) was added to the solution in a quantity corresponding to the OH value of the copolymer. Then the solution was coated on a glass plate by using an applicator, and the coating film was cured by heating in an oven at 150° C. for 30 min. The cured film was peeled from the glass plate and subjected to a tensile test. Each test piece for the tensile test was 10 mm in width and 100 mm in length. The test was made at 23° C. The span between the chucks was 50 mm, and the pulling rate was 10 mm/min. The results are shown in Table 3.

Separately, the solution of each copolymer was spray coated on a chromated aluminum plate and cured at 150° C. The cured film was visually examined and subjected to measurements of hardness and tightness of adhesion in the same manners as in Evaluation Test 2. The results are shown in Table 3.

TABLE 3

|  | Ex. 5 | Ex. 6 | Ex. 7 | Ex. 8 | Comp. Ex. 3 |
|---|---|---|---|---|---|
| Tensile Strength (kg/cm$^2$) | 380 | 230 | 250 | 180 | 70 |
| Elongation (%) | 25 | 60 | 50 | 70 | 80 |
| Pencil Hardness (max. hardness of pencil failed to give scratch) | B | 2B | B | 2B | 4B |
| Cross-cut Adhesion Test (no peel areas among 100 areas tested with cellophane tape) | 100/100 | 100/100 | 100/100 | 100/100 | 100/100 |
| Appearance | A | A | A | A | A |

What is claimed is:

1. A copolymer comprising:
   25 to 75 mol % of a fluoroolefin;
   10 to 70 mol % of a combination of a fatty acid vinyl ester having not more than 4 carbon atoms in the residue of the fatty acid and at least one other carboxylic acid vinyl ester which has a larger number of carbon atoms than said fatty acid vinyl ester and is selected from the group consisting of aliphatic carboxylic acid vinyl esters having at least 4 carbon atoms in the residue of the carboxylic acid and aromatic carboxylic acid vinyl esters;
   3 to 40 mol % of a hydroxyl-containing allyl ether; and
   0 to 20 mol % of a carboxyl-containing monomer;
   the copolymer having a number average molecular weight in the range from 3000 to 10000.

2. A copolymer according to claim 1, wherein said fluoroolefin, said combination of vinyl esters, said hydroxyl-containing allyl ether and said carboxyl-containing monomer amounts to 40–60 mol %, 20–50 mol %, 5–30 mol % and 0–10 mol %, respectively.

3. A copolymer according to claim 1, wherein said fluoroolefin is selected from the group consisting of trifluoroethylene, chlorotrifluoroethylene, tetrafluoroethylene, hexafluoropropene, vinyl fluoride and vinylidene fluoride.

4. A copolymer according to claim 1, wherein the ratio of said fatty acid vinyl ester to said at least one other carboxylic acid vinyl ester is in the range from 95/5 to 5/95 by mol.

5. A copolymer according to claim 1, wherein said fatty acid vinyl ester is selected from the group consisting of vinyl acetate and vinyl propionate.

6. A copolymer according to claim 1, wherein said at least one other carboxylic acid vinyl ester is selected from the group consisting of vinyl benzoate and vinyl p-t-butylbenzoate.

7. A copolymer according to claim 1, wherein said hydroxyl-containing allyl ether is selected from the group consisting of ethylene glycol monoallyl ether, diethylene glyocl monoallyl ether, triethylene glycol monoallyl ether, propylene glycol monoallyl ether, dipropylene glycol monoallyl ether, tripropylene glycol monoallyl ether and hydroxypropyl allyl ether.

8. A copolymer according to claim 1, wherein said carboxyl-containing monomer is selected from the group consisting of acrylic acid, methacrylic acid, vinylacetic acid, allylacetic acid, allyloxyacetic acid and maleic anhydride.

9. A copolymer according to claim 1, further comprising an alkyl vinyl ether such that the total of said alkyl vinyl ether and said combination of vinyl esters amount to 10–70 mol %.

10. A copolymer according to claim 9, wherein the ratio of said combination of vinyl esters to said alkyl vinyl ether is in the range from 90/10 to 30/70 by mol.

11. A copolymer according to claim 9, wherein said alkyl vinyl ether is selected from the group consisting of methylvinyl ether, ethylvinyl ether, n-butylvinyl ether, isobutylvinyl ether, 2-ethylhexylvinyl ether and isooctylvinyl ether.

12. The copolymer of claim 1, wherein the at least one other carboxylic acid vinyl ester is selected from the group consisting essentially of vinyl butyrate, vinyl isobutyrate, vinyl caproate, vinylpivalate, vinyl caprylate and vinyl stearate.

13. The copolymer of claim 1, wherein the at least carboxylic acid vinyl ester comprises a vinyl ester represented by the general formula

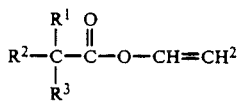

wherein R$^1$, R$^2$ and R$^3$ are alkyl groups at least one of which is methyl group with the proviso that the total number of carbon atoms in R$^1$, R$^2$ and R$^3$ is 7 or 8.

* * * * *